Oct. 7, 1952  N. J. WOODLAND ET AL  2,612,994
CLASSIFYING APPARATUS AND METHOD
Filed Oct. 20, 1949  3 Sheets-Sheet 1
FIG. 1
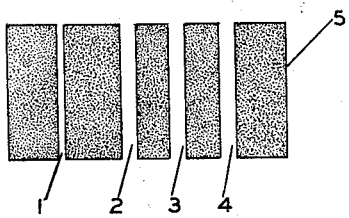
FIG. 2
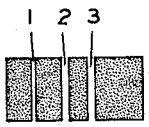
FIG. 3
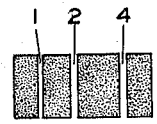
FIG. 4
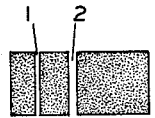
FIG. 5
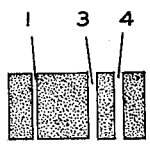
FIG. 6
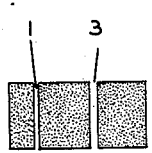
FIG. 7
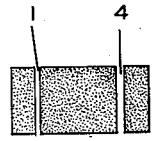
FIG. 8
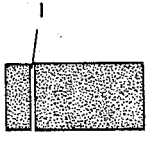
FIG. 9
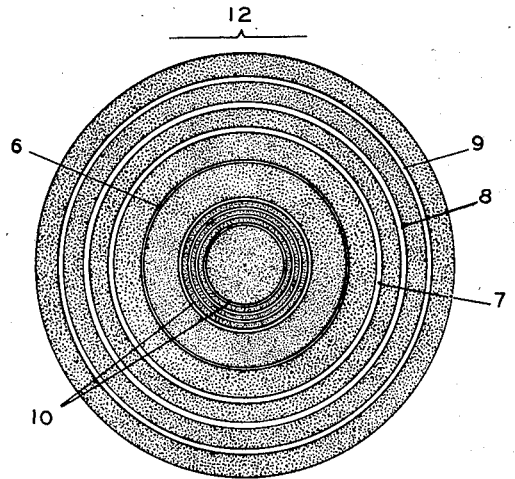
FIG. 10
NOTE: LINES 6, 7, 8, AND 9 ARE LESS REFLECTIVE THAN LINES 10.
INVENTORS:
NORMAN J. WOODLAND
BERNARD SILVER
BY THEIR ATTORNEYS
Howson & Howson Oct. 7, 1952  N. J. WOODLAND ET AL  2,612,994
CLASSIFYING APPARATUS AND METHOD
Filed Oct. 20, 1949  3 Sheets-Sheet 2
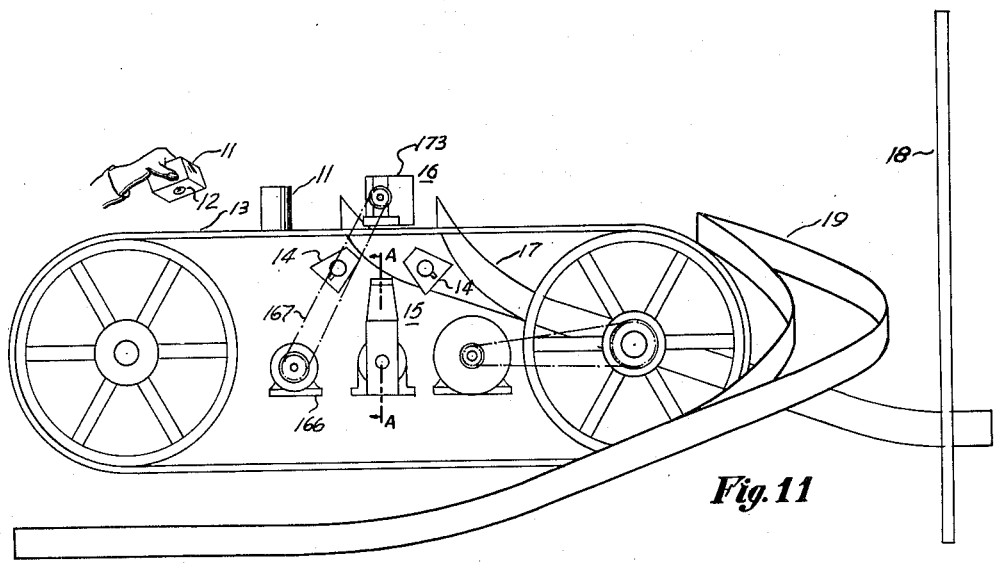
Fig. 11
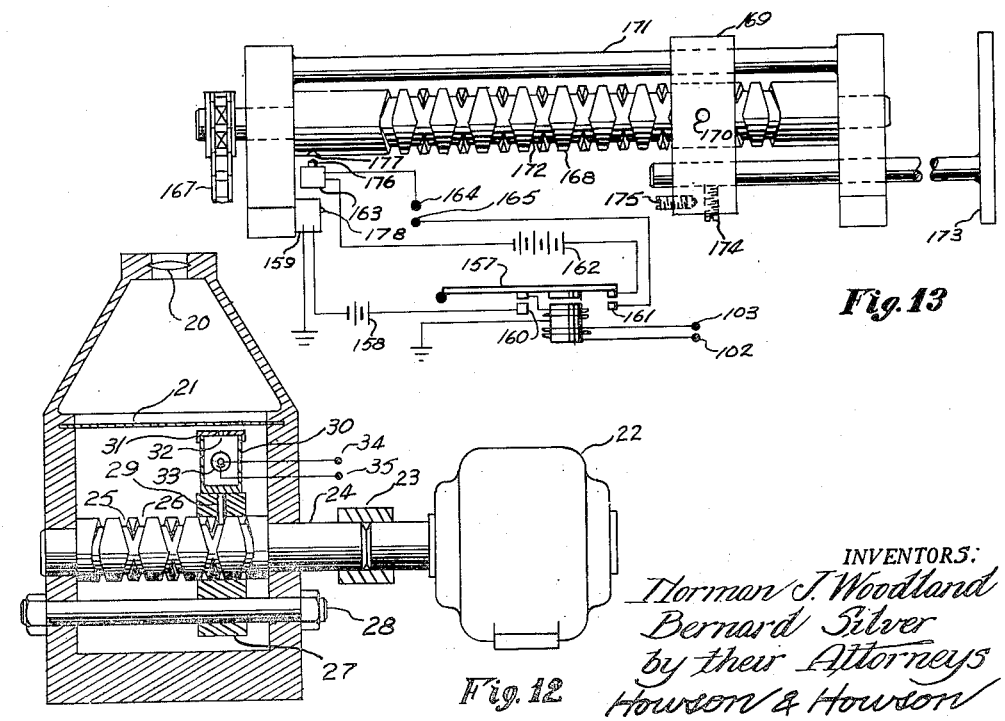
Fig. 13
Fig. 12
INVENTORS:
Norman J. Woodland
Bernard Silver
by their Attorneys
Howson & Howson Oct. 7, 1952 N. J. WOODLAND ET AL 2,612,994
CLASSIFYING APPARATUS AND METHOD
Filed Oct. 20, 1949 3 Sheets-Sheet 3
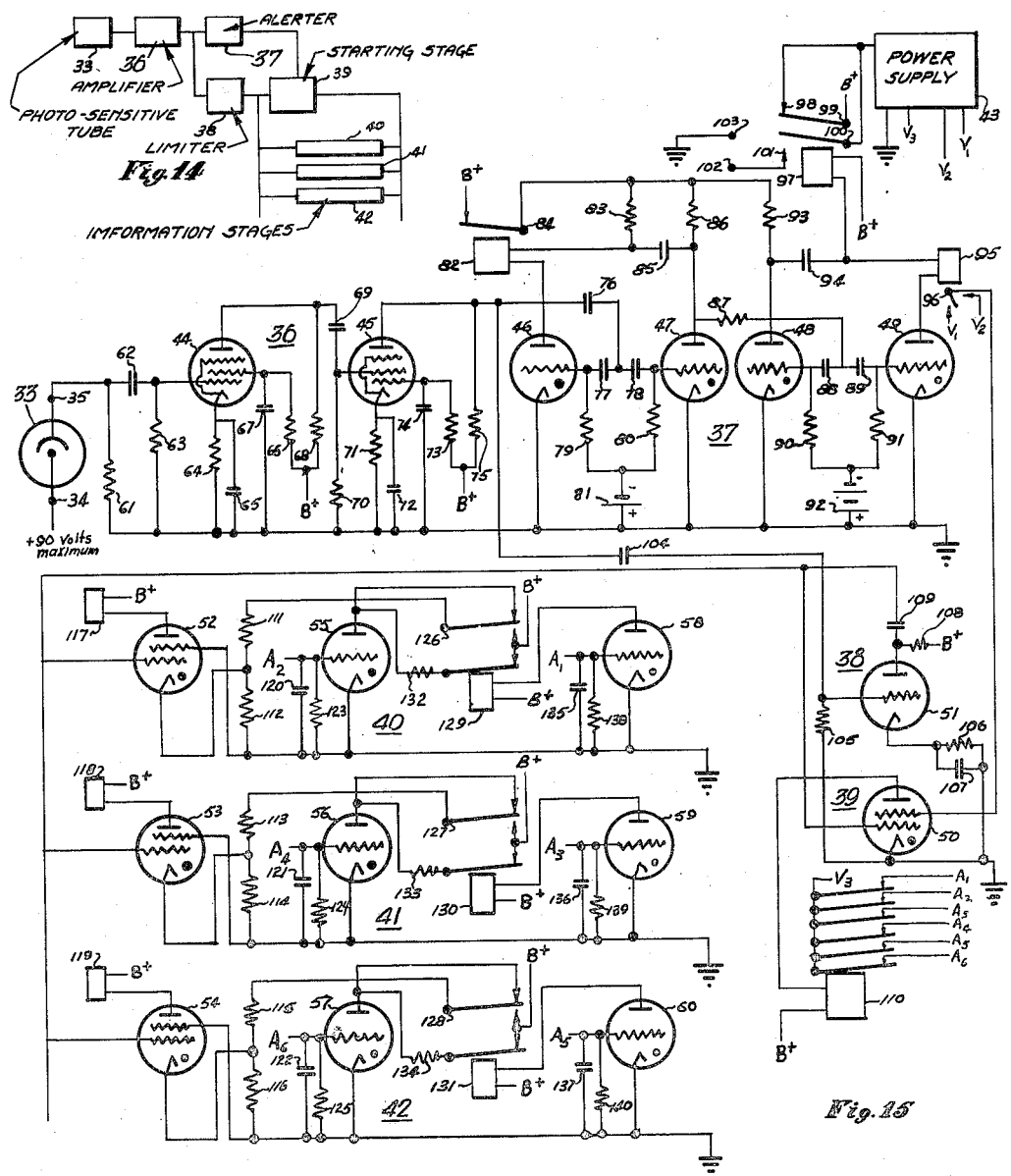
Fig. 14
Fig. 15
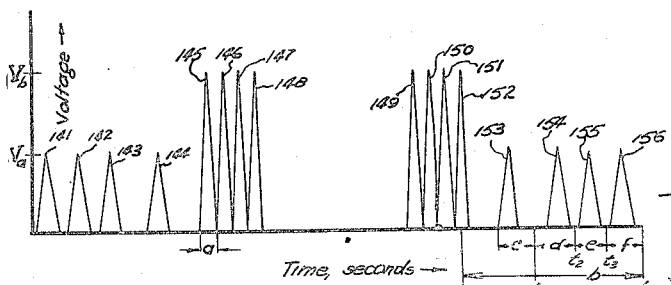
Fig. 16
INVENTORS:
Norman J. Woodland
Bernard Silver
by their Attorneys
Howson & Howson Patented Oct. 7, 1952

2,612,994

UNITED STATES PATENT OFFICE 2,612,994

CLASSIFYING APPARATUS AND METHOD

Norman J. Woodland, Ventnor, N. J., and
Bernard Silver, Philadelphia, Pa.

Application October 20, 1949, Serial No. 122,416

11 Claims. (Cl. 209—111)

This invention relates to the art of article classification and has particular relation to classification through the medium of identifying patterns.

It is an object of the invention to provide automatic apparatus for classifying things according to photo-response to lines and/or colors which constitute classification instructions and which have been attached to, imprinted upon or caused to represent the things being classified.

Another object of the invention is to provide a novel method by which classification patterns consisting of different identifying combinations within a fixed pattern area are utilized to identify different articles.

A further object of the invention is to provide photo-sensitive apparatus which shall classify things without recourse to characteristics of the things themselves for classification instructions.

Another object of the invention is to provide photo-sensitive apparatus which shall classify things or their tokens which are caused to move with motion of translation past the photo-sensitive apparatus without orientation of those things with respect to the direction of translatory motion.

Another object of the invention is to provide photo-sensitive apparatus which can serve as sensory and classifying organ for tabulating, computing and sorting machines.

More concisely stated, it is an object of the invention to provide an automatic apparatus that will execute with precision and dispatch classifying orders which are given to it and will yield up the results of the classification process in an intelligible manner.

One application of the invention is in the so-called "super-market" field. An embodiment of the invention in this application will be described in detail, but it should not be considered that the invention is limited to that field only. The novel features that we consider characteristic of the invention are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 1 is a pattern used in coding classification information;

Figs. 2 through 9 are patterns evolved from Fig. 1;

Fig. 10 is a modification of the pattern of Fig. 1;

Fig. 11 is a diagrammatic view showing an embodiment of the invention;

Fig. 12 is a sectional elevation, at A—A, of the optical and scanning elements utilized in the practice of the invention in accordance with Fig. 11;

Fig. 13 is a right side view of another element utilized in accordance with Fig. 11;

Fig. 14 is a block drawing of the electronic circuit utilized in the embodiment of the invention diagrammed in Fig. 11;

Fig. 15 is a schematic drawing of the electronic circuit utilized in accordance with Fig. 11; and Fig. 16 is a graph utilized in the explanation of the operation of the electronic circuit of Fig. 15.

Fig. 1 shows a pattern of white lines $1$, $2$, $3$ and $4$ on a dark background $5$. Line $1$ is a datum line and the positions of lines $2$, $3$ and $4$ are fixed with respect to line $1$. There are, then, fixed places for three lines $2$, $3$ and $4$ in the pattern, and these lines are termed information lines. While the lines have fixed places in the pattern, the lines do not necessarily fill the places. For example, line $4$ is missing from its place in the pattern in Fig. 3. A zero (0) is associated with a vacant line position and the numeral one (1) with an occupied line position. The information pattern of Fig. 3 could therefore be replaced by the code number 110 and the pattern of Fig. 4 by 101. The information lines have particular weights assigned to them; line $4$ is $2^0$, line $3$ is $2^1$, line $2$ is $2^2$. A digit (1 or 0) associated with a particular line position in the code number is used as the coefficient of the weight assigned to that line position. The information in Fig. 3 is therefore decoded as follows:

$$110 = 1 \cdot 2^2 + 1 \cdot 2^1 + 0 \cdot 2^0 = 6$$

showing that the pattern in Fig. 3 represents classification 6, or the sixth classification, which in practice could be 6¢, department F or volume $vi$, etc. Similarly, Fig. 4 yields up $$101 = 1 \cdot 2^2 + 0 \cdot 2^1 + 1 \cdot 2^0 = 5$$

classification 5. It is seen from Figs. 2 through 8 that three lines in different combinations can be caused to represent seven different classifications. If one more line location were included in the pattern, eight more classifications would be made available; another place would increase the total by sixteen; another by thirty-two, etc. By the incorporation of more and more places for lines into the pattern, the number of classifications grows very fast and can be made large without limit. For example, if there are places for ten classification lines in the pattern, the number 11111,11111 is available. This is decoded as follows:

$$1 \cdot 2^9 + 1 \cdot 2^8 + 1 \cdot 2^7 + 1 \cdot 2^6 + 1 \cdot 2^5 + 1 \cdot 2^4 +$$
$$1 \cdot 2^3 + 1 \cdot 2^2 + 1 \cdot 2^1 + 1 \cdot 2^0 = 1,023$$

Since the information lines 2, 3 and 4 have the same form and color, the only method by which they may be discriminated among is by position. If, however, they are colored differently, position may be neglected in discrimination, for a particular line color can function in the same manner as a particular line position. Further, if the particular colors radiated by the lines are produced by the impinging of ultraviolet light upon fluorescent pigments, the corruption of the pattern by any extraneous non-fluorescent colors in the neighborhood of the pattern is averted. The present embodiment of our invention utilizes a pattern of light and dark lines, but in certain of the modifications of our invention, a pattern utilizing several colors may be used with advantage.

The straight line pattern of Fig. 1 is useful only where the pattern can be oriented with respect to the photosensitive apparatus. The straight line pattern is modified into the circular pattern of Fig. 10 in order that orientation of the pattern be made unnecessary. Lines 6, 7, 8 and 9 of Fig. 10 correspond respectively to lines 1, 2, 3 and 4 of Fig. 1. The series of concentric circles 10 has a function which will be discussed later in this disclosure. As with the straight line pattern, by increasing the number of places for lines in the pattern (or "target") of Fig. 10, the number of classifications may be made large without limit.

In Fig. 11, a system is shown which is utilized for the purpose of classifying such articles as cans and other packages 11 in accordance with the information incorporated into the pattern which is placed on each package 11 in the form of a sticker or stamped mark 12. It may be necessary, for example, to classify the package into seven price categories, namely 1¢, 2¢, 3¢, 4¢, 5¢, 6¢ and 7¢. It has been shown above how this may be accomplished with three line positions, 2, 3 and 4. Accordingly, each package 11 is disposed, with the target 12 down, on a transparent conveyor 13 and advanced thereby to a region where it is strongly illuminated by a plurality of suitable illuminating sources 14.

The radiations reflected by the bottom of the package 11 are projected into the optical and scanning element 15. If the element 15 recognizes a pattern in a particular package, the displacement device 16 quickly pushes the package 11 across the conveyor 13 and onto the delivery chute 17 by means of which it is passed through the barricade 18 to be wrapped for removal from the premises. If the element 15 fails to recognize a pattern 12 on the package 11 by the time the package 11 has left the operating range of the element 15, the package 11 continues along the conveyor 13 until it is automatically placed on the return conveyor 19 which causes it to fail to pass the barricade 18 and returns it toward the point of placement on the conveyor 13.

As described hereinafter, the scanning element includes sensing means which is moved back and forth transversely of the conveyor 13. This insures scanning of the pattern on each of the packages 11 regardless of position of the package on the conveyor, thus eliminating the need for accurate placement of the package on the conveyor.

The function of element 15 is revealed by Fig. 12. Light from the bottom of the package 11 is focused by the lens or plurality of lenses 20 onto the ground glass screen 21. The lens 20 and the distance from lens 20 to screen 21 are so selected that a sharp image of the bottom of the package 11 is produced on the ground glass screen 21 regardless of slight variations in the distance from lens 20 to package 11, an important object of this arrangement. A synchronous motor 22 is connected through a coupling 23 to a shaft 24 bearing a right hand thread 25 which is turned back upon itself to form a left hand thread 26 which is also turned back upon itself into the right hand thread, with the result that there is an endless thread 25—26 upon the shaft 24. A carriage 27 rides on the shaft 24 and is restrained to motion in the direction of the axis of the shaft 24 by the fixed bar 28. A pin 29 in the carriage 27 rides in the thread 25—26 and causes the carriage 27 to oscillate through the extent of the thread 25—26. If the pitch of the thread 25—26 is constant, except on that portion where the thread 25—26 is turning back on itself, the carriage 27 will oscillate at constant velocity except during the small reversal time as the thread 25—26 reverses. A light-tight box 30 with cover 31 is mounted on the carriage 27 so that it has the reciprocating motion of the carriage 27. The cover 31 is provided with an aperture 32 which admits light from a small portion of the picture on the screen 21 to the photo-cell 33. The photo-cell 33 has two terminals, 34 and 35. The velocity of the carriage 27 is sufficiently great that there is positive assurance that the photo-cell, or plurality of photo-cells, 33 will scan the central portion 10 of every pattern 12 passing the scanning plane A—A. Of course the velocity of carriage 27 will depend to some extent upon the speed of the conveyor 13, but there is no close relation therebetween.

The scanning element 15 and its associated electronic circuit have a double function: they must see and recognize the target 12, and after recognition they must see and decode the classification instructions in the target 12. The recognizable portion of the pattern is the central portion 10, which consists of a series of alternate concentric black and white circles. The white lines are highly reflective while the black lines reflect very little light. Since the recognizable lines 10 are centrally located within the pattern 12, all recognized targets 12 will be centrally scanned, an important feature if the information in the pattern is to be correctly decoded. As disclosed previously, the lines 6, 7, 8 and 9 in the target 12 comprise the coded information. It is to be noted that these lines are not as highly reflective as the white lines in the central portion 10. The means by which the invention automatically recognizes the target 12 and translates the coded information which is in the form of lines in the target 12 into intelligible classification information is schematically revealed in the block diagram of Fig. 14 and is revealed in detail in Fig. 15. It is to be noted, however, that this is only one of several systems which may be utilized in obtaining information from the target 12 and from modifications thereof. As the aperture 32 passes over the picture on the screen 21, there are fluctuations in the amount of light which strikes the photo-emissive type tube 33. These fluctuations are due to the different reflective qualities in the various portions of the bottom surfaces of the packages 11, and the light impulses are converted into electrical impulses by the cell 33. As the photo-cell 33 passes the various lines in the target 12, impulses will be generated in the associated circuit and applied to the wide range amplifier 36 which is coupled to an alerter 37 and also to a limiter 38. The limiter, in turn, is coupled to a starting stage 39 and to as many information stages 40, 41 and 42 as there are information line places provided for in the target 12. The alerter 37 is also coupled to the starting stage 39. The information stages 40, 41 and 42 are used to operate a suitable device for indicating the presence or absence of the information lines 7, 8 and 9.

Specifically, a standard full-wave rectifier circuit 43 is employed to provide proper filament voltages and the necessary direct current voltages, both positive and negative with respect to the ground of the circuit, for the operation of the stages involving the photo-tube 33; two-stage pentode amplifiers 44 and 45 which, together with the associated circuit, acts to amplify the positive impulses generated by the photo-tube 33; four thyratrons 46, 47, 48 and 49 which comprise, in conjunction with the associated circuit, a standard scale of eight impulse counter which acts to count all pulses of a predetermined amplitude or higher and which, if eight impulses are counted within a preset time interval, acts to alert the starting tube 50; a limiter tube 51, also coupled to the output of the wideband amplifier 36, which, together with its associated circuit acts to limit all pulses passing through it to a predetermined amplitude; a shield-grid thyratron 50 which starts the information stages 40, 41 and 42 when the correct voltage is applied to the shield grid of the thyratron 50 by the alerter 37 and to the control grid of the thyratron 50 by the limiter 51; and three information stages utilizing shield grid thyratrons 52, 53 and 54 to whose shield grids a starting voltage is applied successively by thyratrons 55, 56 and 57 respectively and then cut off after successive short periods by thyratrons 58, 59 and 60, respectively.

The photocell 33 is connected through terminal 34 to a positive tap on the power supply 43 with a maximum voltage of 90 volts. The cathode is connected from terminal 35 to ground through resistor 61.

The impulses generated in resistor 61 are applied to the wide band amplifier 36 by the coupling condenser 62 which is connected to the control grid of the amplifier 44. The control grid is also connected to ground through resistor 63. The cathode of amplifier tube 44 is connected to ground through a cathode bias circuit utilizing resistor 64 and condenser 65. The screen voltage is obtained from the power supply through the series resistor 66, and the screen grid is also connected to ground through condenser 67. Voltage is applied to the plate of the tube 44 through the series resistor 68. Amplifier tube 45 together with its associated circuit elements 69, 70, 71, 72, 73, 74 and 75 comprise an amplifier stage identical to the preceding one.

The output of the amplifier stages is coupled through condenser 76 to the junction of condensers 77 and 78 which condensers are connected to the grids of thyratrons 46 and 47 respectively. The grids are also connected through resistors 79 and 80 to the negative terminal of a bias cell 81 whose positive terminal is connected to ground. The plate of tube 46 is connected through the operating coil of relay 82, which relay is a single pole normally closed time delay relay, to resistor 83 which is connected to the armature 84 of relay 82. The contact of relay 82 is connected to B plus. Condenser 85 connects the plate of tube 46 to the plate of tube 47 which is also connected to armature 84 through resistor 86. Resistor 87 couples the plate of tube 47 to the junction of condensers 88 and 89 which are connected respectively to the grids of thyratrons 48 and 49. These grids are also connected through resistors 90 and 91 to the negative terminal of bias cell 92 whose positive terminal is connected to ground. The plate of tube 48 is connected to armature 84 through resistor 93 and to the plate of tube 49 by condenser 94. The plate of thyratron 49 is connected to B plus through the operating coils of relay 95, a single pole double throw relay whose armature 96 is connected to the shield grid of thyratron 50 and whose contacts are connected to negative tap terminals $V_1$ and $V_2$ on the power supply 43, and of relay 97, a double pole time delay relay with one normally open contact and one normally closed contact. Normally closed contact 98 of relay 97 is connected to the high voltage tap of the power supply 43 while armature 99 is connected to the B plus terminals of each of the stages of the circuit. Armature 100 operates the normally open contacts of relay 97 and armature 100 is connected to the high voltage terminal of the power supply 43. Normally open contact point 101 is connected to terminal 102 of Fig. 13. Terminal 103 of Fig. 13 is connected to ground.

The output of the amplifier 36 is coupled to the grid triode tube 51, connected as a limiter, by condenser 102. The grid is also connected to ground by grid leak resistor 105. The cathode of the tube 51 is connected to ground through a cathode bias circuit comprised of resistor 106 and condenser 107. The plate is connected to B plus through the series resistor 108 and to the control grids of the starting stage thyratron 50 and of the information stage thyratrons 52, 53 and 54 by condenser 109.

The cathode of starting stage shield grid thyratron 50 is connected to ground and its plate is connected to B plus through the operating coil of relay 110, a six pole normally closed relay whose contacts $A_1$ to $A_6$ inclusive are connected to the grids of the timing thyratrons 55 to 60 inclusive, respectively.

All of the information stages 40, 41 and 42 are identical to one another except for the specific values of the resistors and condensers in the grid circuits of the timing thyratrons 55, 56, 57, 58, 59 and 60. Each information stage utilizes shield grid thyratron 52, 53, or 54, to whose control grids the positive signal pulses are delivered from the limiter 38 by the condenser 109. The shield grid of each tube is connected to ground and the cathode of each is connected to the midpoint of a voltage divider comprised of resistors 111 and 112, 113 and 114, or 115 and 116. The plates of thyratrons 52, 53 and 54 are connected to B plus through the operating coils of relays 117, 118 and 119 respectively. The alerting thyratrons 55, 56 and 57 have R–C circuits comprised of condensers 120, 121 and 122, respectively, and resistors 123, 124, and 125, respectively, connecting from grids to ground. The cathodes of the tubes 55, 56 and 57 are connected to ground and their plates are connected to B plus through terminals 126, 127 and 128 respectively of relays 129, 130 and 131 respectively through resistors 132, 133 and 134 respectively. Resistors 111, 113 and 115 of the voltage dividing networks are connected respectively to the second set of contacts of relays 129, 130 and 131 and thence respectively to the plates of tubes 55, 56 and 57. The stopping thyratrons 58, 59 and 60 have R–C circuits comprised of condensers 135, 136 and 137 respectively and resistors 138, 139 and 140 respectively connected from their grids to ground; their cathodes are connected to ground and their plates are connected to B plus through the operating coils of the double pole, normally closed relays 129, 130 and 131 respectively.

Fig. 16 indicates the voltage wave generated in resistor 61 as the phototube 33 scans the image of the target 12. The scanning is alternately to the right and to the left. Because of the particular design of the target, the same pulse train results from scanning in either direction. For the purposes of this disclosure, the scanning direction is arbitrarily assumed to be from left to right. Each section of this wave will be traced through the system to disclose the operation of the circuit. The first three pulses 141, 142 and 143 are generated as the photocell 33 passes the information lines 7, 8 and 9 of the target 12; they are at the relatively low voltage amplitude $V_a$ because of their relatively poor light reflecting quality. If the gain of the amplifier 36 is A, then these pulses will appear with an amplitude $AV_a$ at the output of the amplifier 36 and at the input to the counting circuit 37 and the limiter 38. The counting circuit 37 is adjusted so that it will only respond to pulses whose amplitudes are greater than $AV_a$, so this series of pulses will have no effect on the counting circuit. The limiter 38 is adjusted by means of its associated circuit in such a manner that the greatest amplitude of voltage applied to the succeeding stages will be $AV_a$. Thus, the first series of pulses with an amplitude of $AV_a$ will be applied to the control grids of the shield grid thyratrons 50, 52, 53 and 54. Since the shield grids of each of these thyratrons is highly negative with respect to the cathodes at this time, pulses of amplitude $AV_a$ will have no effect on these tubes.

The next pulse 144 is generated by the signal ring 6 of the target 12. Since this pulse is of the same amplitude, $AV_a$, as the previous pulses, it will have no effect on the information stages 40, 41 and 42, or on the alerter 37.

The series of pulses 145, 146, 147, 148, 149, 150, 151 and 152 are generated as the photocell 33 passes the signal rings 10 in the center of the target 12 and, because of their relatively good reflecting qualities, are at a higher amplitude than $V_a$, namely $V_b$. These pulses 145 through 152 are amplified by the amplifier 36, appear at its output as pulses of amplitude $AV_b$, and are of great enough amplitude to operate the alerter stage, with the result that the circuit counts the pulses. The first of the series of pulses 145 through 152 fires tube 46. The second extinguishes 46 and fires 47. The third fires 46 again. The fourth extinguishes 46 and 47 and fires 48. The fifth fires 46. The sixth extinguishes 46 and fires 47. The seventh fires 46. The eighth extinguishes 46, 47 and 48 and fires 49. An examination of the sequence reveals that during the normal cycle tube 46 is never firing for a longer period than "$a$" seconds. This fact is made use of in the following manner, to prevent extraneous pulses from completing the alerting cycle: Relay 82, which is in the plate circuit of tube 46, is designed to operate only if tube 46 is in a conducting state for a period longer than "$a$" seconds. Thus, if some pulse fires tube 46 and no other pulses appear in the normal sequence, relay 82 will operate and remove B plus from tubes 46, 47 and 48 and clear the counter. As soon as relay 82 causes tube 46 to be extinguished, the armature of relay 82 is released and the circuit is ready to count again. If the entire sequence of eight signal pulses appear, tube 49 will fire and operate relays 95 and 97. Relay 95 causes a less negative voltage to be applied to the shield grid of the thyratron 50 and any succeeding pulse applied to the control grid will ignite it. Relay 97 is designed to operate "$B$" seconds after tube 49 has fired and to remove the B plus supply from the entire circuit thus extinguishing all of the thyratrons and preparing the circuit for a new cycle when the contacts are released. Relay 97 also operates, through terminals 102 and 103, relay 157, of Fig. 13, which controls the package removal mechanism. The same series of pulses 145 through 152 is applied through the limiter 38 to the thyratrons 50, 52, 53 and 54, but since the tube 50 is not alerted by the alerter 37 until after the last pulse has appeared, these pulses have no effect on the starting stage 39 or the information stages 40, 41 and 42.

Pulse 153 appears during period $c$ as photocell 33 passes starting ring 6 of the target 12 again. The pulse of amplitude $V_a$ generated by starting ring 6 is applied to the amplifier 36 and the pulse appears at its output with an amplitude $AV_a$. This pulse has no effect on the alerter 37, but is passed by the limiter 38 and is applied to the starting stage 39 and the information stages 40, 41 and 42. The starting tube 50 is now in such a state due to the operation of relay 95 that this pulse applied to its control grid will ignite the tube 50 and operate relay 110. Operation of relay 110 removes the negative voltage from each of the R–C circuits connected to the grids of thyratrons 55 through 60, inclusive, and allows the electrons stored in condensers 120, 121, 122, 135, 136 and 137 to leak off through resistors 123, 124, 125, 138, 139 and 140. When the voltage becomes high enough on the grids of tubes 55, 56 and 57 they fire and reduce the voltage across the voltage dividers 111 through 116, thus reducing the difference in voltage between the shield grids and cathodes of thyratrons 52, 53 and 54. This alerts each of these tubes and allows it to fire if a pulse appears upon its control grid. The constants of the R–C circuits connected to the grids of tubes 55, 56 and 57 are adjusted so that tube 55 will fire at $t_1$, tube 56 will fire at $t_2$ and tube 57 will fire at $t_3$. The associated circuits of tubes 58, 59 and 60 are adjusted so that they will fire at $t_2$, $t_3$ and $t_4$ respectively and the firing of each of these tubes operates relays 129, 130 and 131, respectively, removes B plus from each of the tubes 55, 56 and 57, extinguishing them in turn, and increasing the differences in potential between the cathodes and shield grids of tubes 52, 53 and 54 respectively. The result is that tube 52 can be ignited by a pulse 154 on its control grid only during period $d$ and tube 53 can be ignited by a pulse 155 on its control grid only during period $e$, and tube 54 can be ignited by a pulse 156 on its control grid only during period $f$. Pulses 141, 142, 143, 154, 155 and 156 may or may not be present, depending upon what information is coded in the pattern being scanned.

The closing of relay 117 indicates that the first information line 7, corresponding to 2⁰, is present in its place in target 12. In a similar manner, the closing of relays 118 and 119 represents the presence of the information lines 8 and 9, respectively. The pattern in which the relays 117, 118 and 119 close determines a code number which constitutes the yielding up in an intelligible manner of the classification information. For example, if relays 119 and 118 close, but relay 117 fails to close, the code number is 110, which puts the package 11, which has just passed the electric eye element 15, in classification 6. The relays 117, 118 and 119 can be caused to operate tabulating, computing and/or sorting machines.

The closing of the normally open relay 157 of Fig. 13 is accomplished by the closing of relay 97. The closing of relay 157 indicates two things: First, the scanning mechanism of Fig. 12, used in conjunction with the electronic circuit of Fig. 15, has seen and recognized the central portion 10 of the target 12; and, second, enough time (b seconds) has elapsed for the whole target to have been scanned. Although the receipt of operating energy through terminals 102 and 103 of relay 157 is only momentary, the relay 157 when once closed will be held closed by the holding coil energy supplied from the cell 158 through normally closed limit switch 159 and the set of normally open contacts 160. The closing relay 157 also closes contacts 161 which delivers energy from the source of potential 162 through solenoid 163 to terminals 164 and 165 of motor 166 (Fig. 11). By means of the chain 167, the motor 166 causes the shaft 168 to revolve, which results in the oscillation of the carriage 169 due to the effects of pin 170, fixed bar 171 and thread 172 in the same manner as the corresponding elements of Fig. 12 cause the carriage 27 to oscillate. A pusher 173 is fastened to the carriage 169 by set screw 174. Pusher 173 travels across the belt in a direction parallel to scanning plane A—A pushing onto the delivery chute 17 any package 11 which happens to be in its operating range. The motion of the pusher 173 always begins at the extreme left end of its travel and the motion is limited to one cycle per closing of relay 157. This is because the holding circuit is broken by the opening of the limit switch 159 by screw 175 with the result that the motor is stopped. The opening of relay 157 deenergizes solenoid 163 and the spring loaded plunger 176 is forced against shaft 168. Inertia causes shaft 168 to continue to revolve until plunger 176 enters hole 177 and shaft 168 abruptly and precisely stops. Screw 175 is so adjusted that it engages contact button 178 on limit switch 159 at the extreme end of travel of carriage 169, and coasts away from button 178 before plunger 176 enters hole 177. When relay 157 closes and causes the motor 166 to be energized relay 157 also causes the solenoid 163 to be energized, thus withdrawing plunger 176 from hole 177 and allowing shaft 168 to be revolved.

In the foregoing description it has been assumed that the objects to be classified, such as represented by the packages 11 in Fig. 11, have the classifying information applied thereto and are scanned by the photo-sensitive apparatus. However the classification may be carried out by means of tokens of the actual objects, in which case the tokens would bear the classifying information and would be scanned by the apparatus. Therefore, the word "article," as used in the claims, is intended to mean either the objects being classified or their tokens.

It should be noted further that in a broad sense the apparatus effects classification of information represented by the markings, and the apparatus can be used as a means for classifying information whenever desired.

From the foregoing description, it will be seen that the invention provides a novel classifying apparatus which may be used for various purposes. It will be understood, of course, that the values of the circuit elements will be determined in any instance by the particular operating circumstances. Moreover, the invention is capable of various embodiments and is not limited to the particular embodiment illustrated and described.

We claim:

1. Apparatus for classifying articles having thereon concentric circular light-reflective outer classification lines and inner auxiliary lines; comprising means for continuously moving the articles in a straight path past a scanning position; scanning means at said position for producing electrical pulses corresponding to said lines; means for oscillating said scanning means transversely of said path to effect scanning diametrically of the circular pattern on each article; a plurality of normally-inoperative electronic classifying devices; electronic means responsive to the pulses corresponding to said auxiliary lines for conditioning said devices for operation; and means for effecting operation of said devices, by the pulses corresponding to said classification lines, in a pattern corresponding to the pattern of the classification lines on each article.

2. Apparatus for classifying articles according to different identifying combinations of a predetermined number of positionally characterized classifying markings on the articles, comprising means for producing electrical pulses in time-spaced relation corresponding to the positional characterization of said markings, a plurality of normally-inoperative classifying devices, means for rendering said devices successively operative in time sequence corresponding to the time sequence of said pulses, and means for supplying said pulses to all of said devices, whereby said devices are operated according to the pattern of the classifying markings on an article.

3. Apparatus for classifying articles having provided thereon positionally characterized classifying markings and auxiliary markings, comprising means for producing electrical pulses corresponding to said markings, a plurality of normally-inoperative classifying devices, means operable by the pulses corresponding to said auxiliary markings for rendering said devices successively operative in time sequence according to said classifying markings, and means for supplying to all of said devices the pulses corresponding to said classifying markings.

4. Apparatus for classifying articles according to different identifying combinations of a predetermined number of positionally characterized classifying markings on the articles, comprising means for producing electrical pulses in time-spaced relation corresponding to the positional characterization of said markings, a plurality of thyratrons, a plurality of relays operable respectively by said thyratrons, means for rendering said thyratrons successively operative in time sequence corresponding to the time sequence of said pulses, and means for supplying said pulses to all of said thyratrons, whereby said thyratrons are operated according to the pattern of the classifying markings on an article.

5. Apparatus for classifying articles having provided thereon positionally characterized classifying markings and auxiliary markings, comprising means for producing electrical pulses corresponding to said markings, a plurality of thyratrons, a plurality of relays operable respectively by said thyratrons, means operable by the pulses corresponding to said auxiliary markings for rendering said thyratrons successively operative in time sequence according to said classifying markings, and means for supplying to all of said thyratrons the pulses corresponding to said classifying markings.

6. Apparatus for classifying articles having provided thereon classification markings and auxiliary markings; comprising a plurality of normally-inoperative classifying devices; means responsive to said markings for producing electrical pulses; means including an electronic counter responsive to the pulses corresponding to said auxiliary markings for conditioning said devices for operation; and means for effecting operation of said devices, by the pulses corresponding to said classification markings, in a pattern corresponding to the pattern of said classification markings on each article.

7. Apparatus for classifying articles having provided thereon classification markings and auxiliary markings, comprising a plurality of normally inoperative classifying devices, means responsive to said markings for producing electrical pulses, means responsive to pulses produced from certain of said auxiliary markings for rendering said devices operative, means responsive to a starting pulse produced from one of said auxiliary markings for starting operation of said devices, and means for supplying to said devices the pulses produced from said classification markings.

8. Apparatus for classifying information in response to a pattern including a series of markings of predetermined number and other markings representing information, said apparatus comprising means for producing time-spaced pulses corresponding to said markings, an electronic counter coupled to said means to receive pulses corresponding to said series of markings, a plurality of normally inoperative classification devices, means for rendering said devices operative upon completion of a counting operation by said counter, and means for supplying to said devices the pulses corresponding to said other markings.

9. Apparatus for classifying information in response to a pattern including a series of markings of predetermined number, a starting marking and other markings representing information, said apparatus comprising means for producing time-spaced pulses corresponding to said markings, an alerter stage coupled to means and operable by the pulses corresponding to said series of markings, a starting stage coupled to said alerter stage and conditioned thereby for operation, means for effecting operation of said starting stage in response to the pulse corresponding to said starting marking, and information-classifying stages rendered operable by said starting stage and connected to receive the pulses corresponding to said other markings.

10. Apparatus according to claim 9, wherein said alerter stage comprises an electronic counter, and the starting and classifying stages include shield grid thyratrons.

11. Apparatus for classifying information in response to a pattern including concentric circular outer classification lines and inner auxiliary lines; comprising means for scanning diametrically of said pattern and for producing electrical pulses corresponding to said lines; a plurality of normally-inoperative electronic classifying devices; electronic means responsive to the pulses corresponding to said auxiliary lines for conditioning said devices for operation; and means for effecting operation of said devices, by the pulses corresponding to said classification lines, in a pattern corresponding to the pattern of the classification lines.

NORMAN J. WOODLAND.
BERNARD SILVER.

REFERENCES CITED

The following references are of record in the file of this patent:

UNITED STATES PATENTS

| Number | Name | Date |
| --- | --- | --- |
| 1,985,035 | Kermode | Dec. 18, 1934 |
| 2,020,925 | Young | Nov. 12, 1935 |
| 2,224,646 | Friedman | Dec. 10, 1940 |
| 2,280,948 | Guliksen | Apr. 28, 1942 |
| 2,358,051 | Broido | Sept. 12, 1944 |
| 2,400,574 | Rea | May 21, 1946 |
| 2,441,596 | Reitter | May 18, 1948 |

FOREIGN PATENTS

| Number | Country | Date |
| --- | --- | --- |
| 256,223 | Great Britain | Sept. 1, 1927 |